United States Patent
Florez Choque et al.

(10) Patent No.: US 10,311,334 B1
(45) Date of Patent: Jun. 4, 2019

(54) LEARNING TO PROCESS IMAGES DEPICTING FACES WITHOUT LEVERAGING SENSITIVE ATTRIBUTES IN DEEP LEARNING MODELS

(71) Applicant: Capital One Services, LLC, McLean, VA (US)

(72) Inventors: Omar Florez Choque, Oakland, CA (US); Erik Mueller, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/213,059

(22) Filed: Dec. 7, 2018

(51) Int. Cl.
*G06K 9/62* (2006.01)
*G06K 9/00* (2006.01)

(52) U.S. Cl.
CPC ....... *G06K 9/6231* (2013.01); *G06K 9/00228* (2013.01); *G06K 9/00302* (2013.01); *G06K 9/6215* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,301,370 | B1 | 10/2001 | Steffens et al. | |
| 7,318,051 | B2 * | 1/2008 | Weston | G06K 9/6215 706/12 |
| 7,624,074 | B2 * | 11/2009 | Weston | G06N 20/00 706/1 |
| 8,861,804 | B1 * | 10/2014 | Johnson | G06K 9/00221 382/118 |
| 9,489,373 | B2 * | 11/2016 | Simard | G06F 17/2785 |
| 9,582,490 | B2 * | 2/2017 | Simard | G06F 17/2785 |
| 9,792,492 | B2 * | 10/2017 | Soldevila | G06K 9/00362 |
| 2006/0020563 | A1 * | 1/2006 | Coleman | G06N 3/049 706/20 |
| 2011/0106735 | A1 * | 5/2011 | Weston | G06F 19/24 706/12 |
| 2017/0161635 | A1 * | 6/2017 | Oono | G06N 7/005 |
| 2017/0357896 | A1 * | 12/2017 | Tsatsin | G06N 3/084 |
| 2018/0247193 | A1 * | 8/2018 | Holtham | G06K 9/6215 |
| 2018/0247227 | A1 * | 8/2018 | Holtham | G06K 9/6215 |

OTHER PUBLICATIONS

Jordan, Jeremy., "Variational autoencoders" Mar. 19, 2018 <URL: https://www.jeremyjordan.me/variational-autoencoders/>.

* cited by examiner

*Primary Examiner* — Anand P Bhatnagar (57) ABSTRACT

Systems, methods, and articles of manufacture to generate, by a neural network of a variational autoencoder, a latent vector for a first input image, generate, by the neural network of the variational autoencoder, a first reconstructed image by sampling the latent vector for the first input image, determine a reconstruction loss incurred in generating the first reconstructed image based at least in part on: (i) a difference of the first input image and the first reconstructed image, and (ii) a master model trained to detect a sensitive attribute in images, determine a total loss based at least in part on the reconstruction loss and a classification loss, and optimize a plurality of weights of the neural network of the variational autoencoder based on a backpropagation operation and the determined total loss, the optimized neural network trained to not consider the sensitive attribute in images.

20 Claims, 6 Drawing Sheets

LEARNING TO PROCESS IMAGES DEPICTING FACES WITHOUT LEVERAGING SENSITIVE ATTRIBUTES IN DEEP LEARNING MODELS

TECHNICAL FIELD

Embodiments herein generally relate to facial recognition, and more specifically, to techniques for learning to recognize faces and/or emotions without leveraging sensitive attributes in deep learning models.

BACKGROUND

Facial recognition allows computing systems to detect and/or identify faces in images. By implementing facial recognition, services can be personalized to an identified user. However, facial recognition techniques may often consider sensitive attributes, or features, such as gender, age, and/or race. For example, conventional deep learning models used for facial recognition may encode these sensitive attributes in a mathematical space, which may affect an output of the model, and in some use cases may therefore affect the personalization of services or treatment of individuals. It is thus desirable to remove opportunities for any biases attributed to sensitive attributes from affecting the output of a model. Therefore, there is a need for facial recognition techniques that do not consider sensitive attributes.

SUMMARY

Embodiments disclosed herein include systems, methods, and computer program products to recognize faces without leveraging sensitive attributes in deep learning models. In one example, a neural network of a variational autoencoder may generate a latent vector for a first input image. The neural network of the variational autoencoder may then generate a first reconstructed image by sampling the latent vector for the first input image. The variational autoencoder may determine a reconstruction loss incurred in generating the first reconstructed image based at least in part on: (i) a difference of the first input image and the first reconstructed image, and (ii) a master model trained to detect a sensitive attribute in images. The variational autoencoder may determine a total loss based at least in part on the reconstruction loss and a classification loss. A plurality of weights of the neural network of the variational autoencoder may be optimized based on a backpropagation operation and the determined total loss, the optimized neural network trained to not consider the sensitive attribute in images.

DETAILED DESCRIPTION

Embodiments disclosed herein provide learning techniques that do not consider sensitive attributes (or features) such as gender, age, race, and/or ethnicity when processing digital images (e.g., for facial recognition, facial identification, emotion detection, etc.). Generally, embodiments disclosed herein train a variational autoencoder comprising a "student" neural network model using a "master" neural network model to guide the student neural network model. The master neural network model is trained for one or more sensitive tasks, such as gender recognition, age recognition, and the like. During training of the student model, the master model penalizes the student model each time the student model learns a sensitive attribute in some embedding space. Once trained, the variational autoencoder may generate a reconstructed image based on an input image depicting one or more human faces, where the reconstructed image does not contain sensitive attributes but is still usable for classification tasks. The reconstructed image can then be stored or input into a facial recognition model used for classification tasks (e.g. for classifying a face or emotion, etc.).

Advantageously, embodiments disclosed herein are easily integrated into existing processing pipelines, thereby improving the fields of face recognition, emotion detection, facial identification, and the like. Furthermore, embodiments disclosed herein can be scaled to any master model that is trained in any number and type of sensitive tasks (e.g., gender recognition, age recognition, race recognition, etc.). Further still, embodiments disclosed herein are fully differentiable, requiring minimal human intervention for implementation and operation. More generally, embodiments disclosed herein provide high accuracy inference for face recognition, face identification, and/or emotion recognition, which are important steps for personalizing user experiences, while removing sensitive attributes that can lead to undesirable bias or privacy issues.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for a required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

Figure 1:
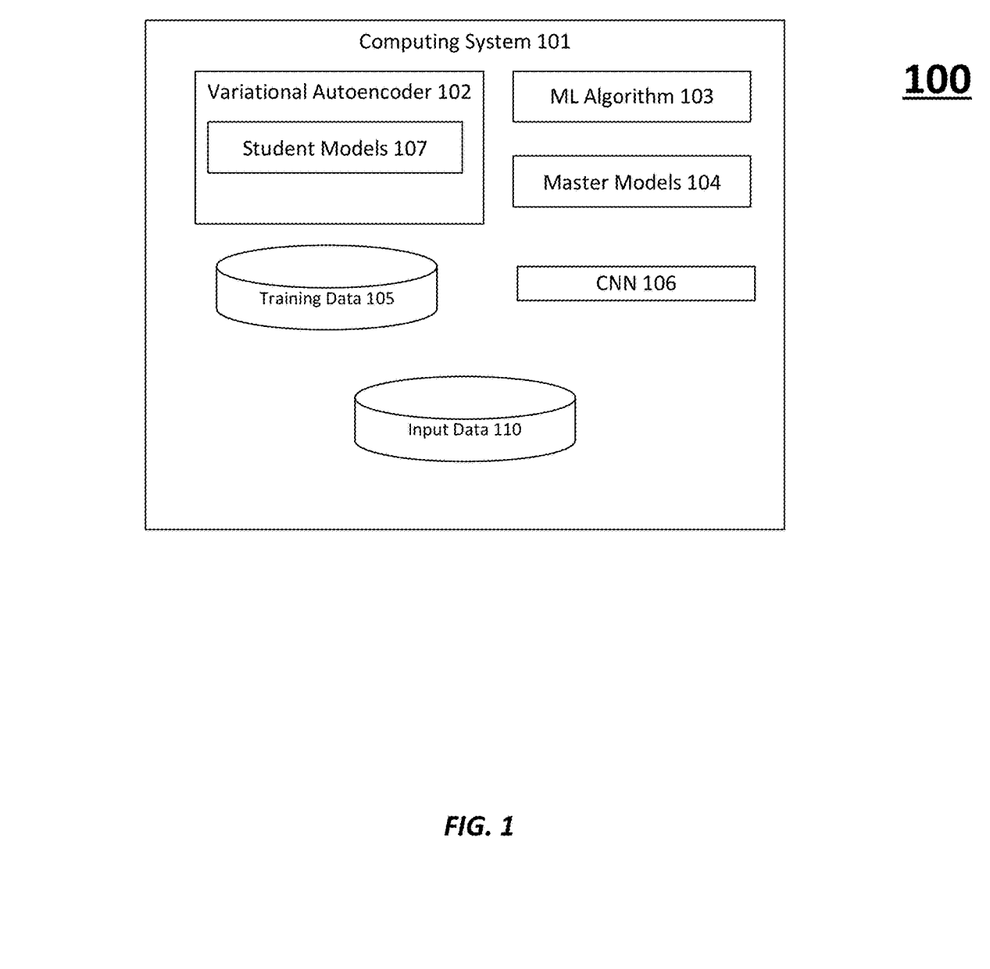
FIG. 1 illustrates an embodiment of a system.

FIG. 1 depicts a schematic of an exemplary system 100, consistent with disclosed embodiments. The system 100 includes at least one computing system 101. The computing system 101 is representative of any number and type of computing system, such as a server, workstation, laptop, compute cluster, virtualized computing system, smartphone, a gaming console, and the like. As shown, the computing system 101 includes a variational autoencoder (VAE) 102, a machine learning (ML) algorithm 103, one or more master models 104, a data store of training data 105, a convolutional neural network (CNN) 106, and a data store of input data 110.

The variational autoencoder 102 is a deep learning system which provides a probabilistic approach to describing an observation in latent space. The master models 104 are representative of learning models that have been trained by at least one ML algorithm 103 to detect "sensitive" attributes. The sensitive attributes may be any type of personal attribute, such as age, race, gender, skin color, religion, nationality, and the like. Therefore, for example, the master models 104 may be used to determine the age of a person depicted in a digital image, the gender of a person depicted in an image, and/or the race of a person depicted in an image. As such, the master models 104 have been trained to learn features, or combinations of features, that are relevant toward detecting a sensitive attribute. For example, a master model 104 that is used for age determination may consider at least the features of wrinkles on skin and the presence of gray hair when determining a person's age depicted in an image.

The variational autoencoder 102 illustratively includes one or more student models 107. The student models 107 are generated during a training phase of the variational autoencoder 102, where at least one master model 104 is used as a guide to ensure that the student models 107 do not learn features that are relevant to detecting particular sensitive attributes. Generally, during training, the student model 107 is penalized when the student model learns a feature that is relevant to detecting particular sensitive attributes. As such, in one example, the student model 107 may not include any features (or certain particular features) that are relevant to detecting particular sensitive attributes based on feedback from the master model 104 and/or the variational autoencoder 102 during training.

In at least one embodiment, the master models 104 and the student models 107 are neural networks. Example neural networks include convolutional neural networks (CNNs), artificial neural networks, deep neural networks, and recurrent neural networks. However, the master models 104 and the student models 107 may be other types of learning models, such as machine learning (ML) models, support vector machines, Bayesian networks, and genetic algorithms. Any reference to machine learning models and/or neural networks herein should not be considered limiting of the disclosure.

Once trained, the variational autoencoder 102 may use the student models 107 during runtime operations. During the runtime operations, the variational autoencoder 102 may receive a digital input image from the input data 110. The variational autoencoder 102 may use one or more of the student models 107 to generate a reconstructed version of the input image by applying a plurality of weights in the student models 107 to the data of the input image (e.g., one or more matrices of pixel values of the digital input image). Thus, a reconstructed image may be generated to not include one or more of a plurality of attributes, which may include sensitive attributes. For example, the reconstructed version of the input image may not include sufficient sensitive attributes that may be used to, for example, determine a person's age, gender, and/or race. Once generated, the reconstructed version of the input image may be stored and/or may be used for any image processing purpose, such as classification, face detection, emotion detection, identity determination, etc. Advantageously, however, these image processing functions will not be able to determine sensitive attributes (e.g., age, race, gender) of persons depicted in the reconstructed images.

Figure 2:
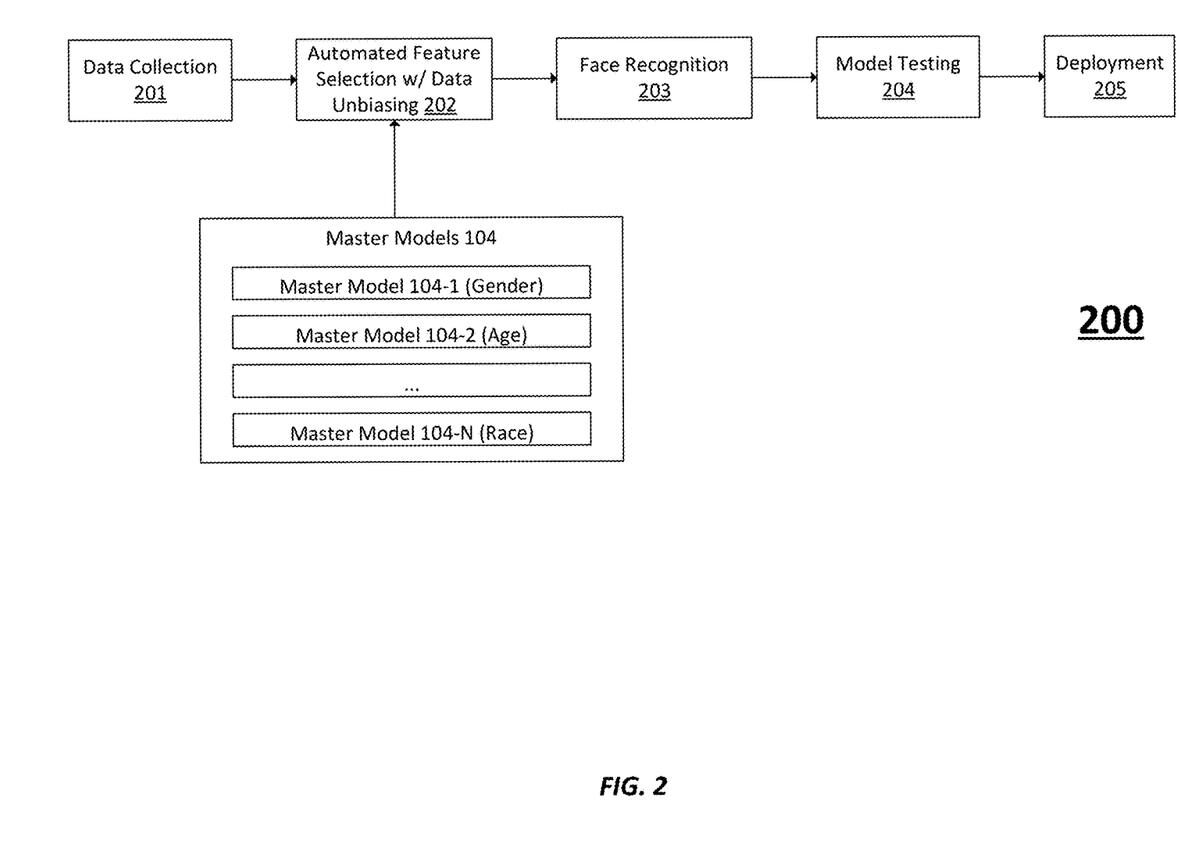
FIG. 2 illustrates an embodiment of a processing pipeline that includes data unbiasing.

FIG. 2 illustrates an embodiment of a processing pipeline 200 that includes data unbiasing. As shown, the processing pipeline 200 includes a data collection step 201, an automated feature selection and data unbiasing step 202, a facial recognition step 203, a model testing step 204, and a deployment step 205. Generally, at block 201, input data is received (e.g., in the form of the training data 105, and/or the input data 110, and/or data from other sources). At step 202, the variational autoencoder 102 performs automated feature selection with data unbiasing to generate the student models 107. Generally, the "unbiasing" portion of step 202 removes "bias" from the student models 107 such that the student models 107 do not consider any one or more sensitive attributes (or other non-sensitive attributes) in the original input data when processing images. As stated, the training in step 202 is guided by one or more of the master models 104, which illustratively include a master model 104-1 trained to determine the gender of a person depicted in an image, a master model 104-2 trained to determine the age (or age-range or threshold age) of a person depicted in an image, and a master model 104-N trained to determine the race of a person depicted in an image.

Once trained, the variational autoencoder 102 including the student models 107 may be used to perform facial recognition at step 203. However, the facial recognition performed at step 203 is based on a reconstructed version of an input image, where the reconstructed image does not include enough data to allow the determination of one or more sensitive attributes of a person depicted in an input image. For example, at block 203, the variational autoencoder 102 may generate a reconstructed image that allows the student model 107 to determine a face is depicted in the reconstructed image. In such an example, however, the master model 104-1 would not be able to determine the age of the person depicted in the reconstructed image. At step 204, the variational autoencoder 102 including the student model 107 is tested for accuracy. At step 205, the variational autoencoder 102 including the student model 107 is deployed for use (e.g., within an organization, publicly via the Internet, etc.).

Figure 3:
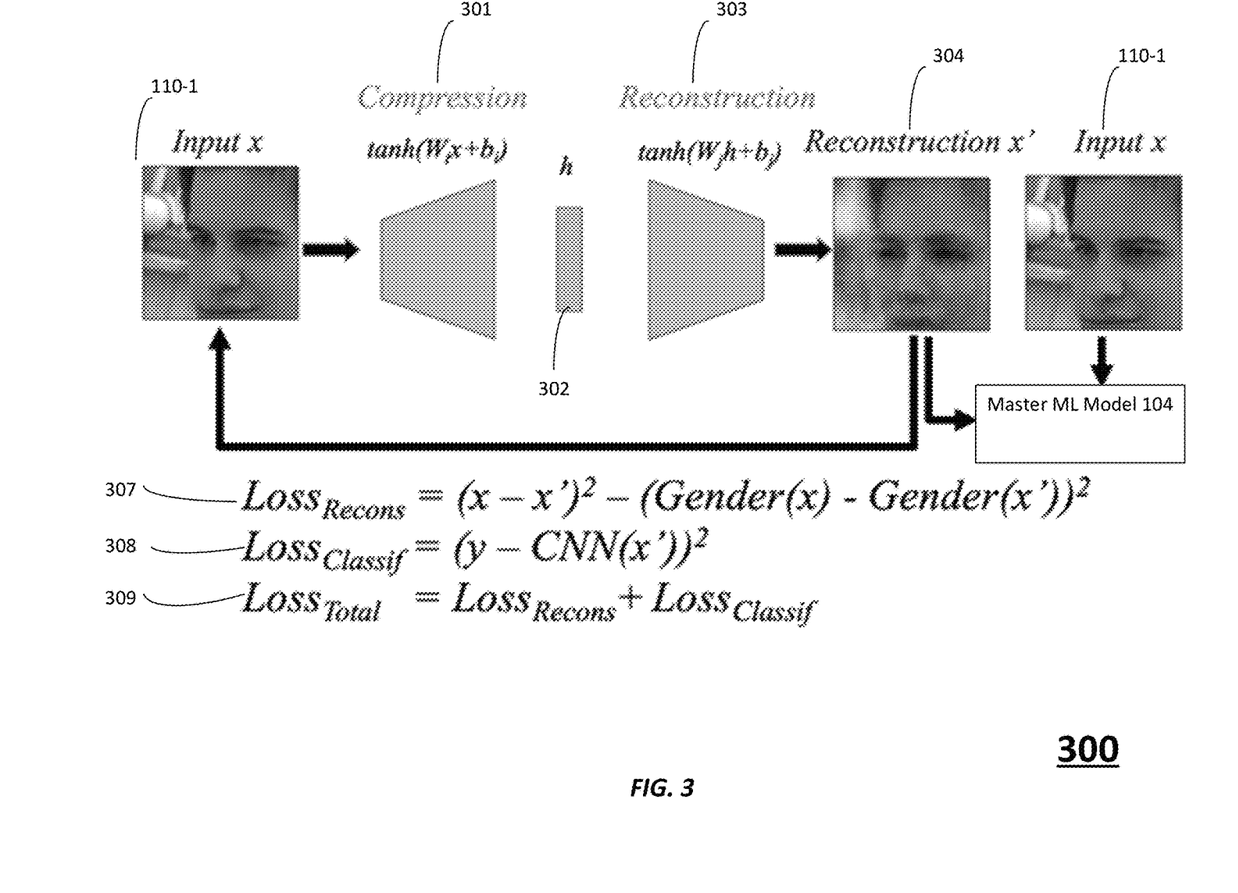
FIG. 3 illustrates an embodiment of training a variational autoencoder to remove sensitive attributes.

FIG. 3 illustrates an embodiment of a processing flow 300 to train the variational autoencoder 102 to remove sensitive attributes. As shown, the variational autoencoder 102 receives an input image 110-1 depicting a face. At block 301, the student model 107 (e.g., a neural network) compresses the input image 110-1. Stated differently, the student model 107 encodes the input image 110-1 into a latent vector 302 (denoted "h" in FIG. 3). The latent vector 302 may, therefore, include values and/or a range of possible values for each feature of the input image. For example, the latent vector 302 may reflect whether a person in the input image is wearing glasses, whether the person is smiling, the color of the person's eyes, etc. To generate the latent vector 302, the student model 107 applies one or more functions to the matrix representation of the input image 110-1. For example, in embodiments where the student model 107 is a neural network, one or more layers of the neural network include one or more neurons. The one or more neurons of each layer may receive the input image 110-1 and/or the output of a previously connected layer as input. An activation function of the one or more neurons may then generate an output based on the received input data and one or more weight values of each respective neuron.

The variational autoencoder 102 may then sample the latent vector 302 in a reconstruction step 303 to generate a reconstructed image 304 representing a reconstruction of the input image 110-1. Generally, the student model 107 may generate the reconstructed image 304 based on the sampled values of the latent vector 302. For example, in embodiments where the student model 107 is a neural network, one or more layers of the neural network may be used to process the sampled values of the latent vector 302 to generate the reconstructed image 304. As shown, the reconstructed image 304 is augmented to be of lower quality than the input image 110-1, and therefore includes less data that can be used to determine one or more sensitive attributes of the person depicted in the images (e.g., gender, race, age, etc.).

Furthermore, as stated, the variational autoencoder 102 considers one or more master models 104 when training the student models 107. For example, the variational autoencoder 102 may consider the master model 104-1 for determining gender, the master model 104-2 for determining age, and/or the master model 104-N for determining race. The particular master models 104 used to train the student models 107 may be tunable given one or more selected sensitive features. Generally, the variational autoencoder 102 may use one or more measures to determine the behavior of the student models 107 in classifying faces without considering certain features, which may include sensitive attributes or features. In one example, the variational autoencoder 102 considers reconstruction loss, which computes the difference between the original input image 110-1 and the reconstructed image 304 (e.g., subtraction of the values of the input image 110-1 and the reconstructed image 304) and favors any discrepancy in recognizing the same gender in both images. In one embodiment, equation 307, depicted in FIG. 3 and reproduced below, captures the reconstruction loss (represented as "$Loss_{Recons}$"):

$$Loss_{Recons}=(x-x')^2-(Gender(x)-Gender(x'))^2 \quad \text{Equation 307}$$

In equation 307, "x" corresponds to the data of the input image 110-1, while "x'" corresponds to the data of the reconstructed image 304. Therefore, (x–x') represents a computed difference of the matrices of the input image 110-1 and the reconstructed image 304. Furthermore, in equation 307, "Gender(x)" corresponds to the output of the master model 104 based on the input image 110-1, while Gender(x') corresponds to the output of the master model 104 based on the reconstructed image 304. Therefore, in the example depicted in Equation 307, the master model 104 corresponds to the master model 104-1 that determines gender. The output of the master model 104-1 is a vector indicating the determined gender of a person depicted in the images 110-1, 304. However, as stated, other master models 104 may be used to guide the training of the student models 107.

In addition and/or alternatively, the variational autoencoder 102 may consider a classification loss when training the student models 107. The classification loss generally computes the similarity between a predicted output of the CNN 106 based on the reconstructed image 304 and an actual output of the CNN 106 based on the input image 110-1. In one example, the actual output of the CNN 106 represents whether the input image 110-1 contains a face or does not contain a face. However, in other examples, the output of the CNN 106 may represent the presence of other features (or objects) in the input image 110-1 (e.g., does a depicted face express the emotion of happiness). In one embodiment, equation 308 is used to determine the classification loss, reflected as "$Loss_{Classif}$":

$$Loss_{Classif}=(y-CNN(x'))^2 \quad \text{Equation 308}$$

In equation 308, "y" is the actual output of the CNN 106 based on the input image 110-1 (e.g., a latent vector). In one embodiment, "y" is previously determined. Furthermore, in equation 308, "CNN(x')" corresponds to the output of the CNN 106 based on the reconstructed image 304 ("x'"). Generally, higher values generated by equation 308 reflect that the student models 107 of the variational autoencoder 102 is not accurately classifying human faces in the input image 110-1.

In addition and/or alternatively, the variational autoencoder 102 may consider a total loss when training the student models 107. In one embodiment, the total loss is a combination of the reconstruction loss and the classification loss, and is depicted by equation 309:

$$Loss_{Total}=Loss_{Recons}+Loss_{Classif} \quad \text{Equation 309}$$

The total loss may be a measurement of how well the input image 110-1 was reconstructed as the reconstructed image 304 and how useful the reconstructed image 304 is for classification. Once the loss parameters are determined (e.g., one or more of the reconstruction loss, classification loss, and/or total loss), the weights of the neural network (e.g., the student models 107) are optimized by computing gradients of the loss parameters (or loss functions) during a backpropagation operation. Backpropagation is a technique used in training neural networks to compute gradient that is needed in the computation of the weights of each neuron in the neural network. Therefore, via backpropagation, the weights of the neural network (e.g., the student models 107) are refined such that the loss function is minimized and the neural network does not consider sensitive attributes (and/or exclude sensitive attributes), as the determined losses penalize the neural network for considering these attributes. Generally, the operations depicted in FIG. 3 may be performed any number of times to train the student models 107.

Once the student models 107 are trained, the variational autoencoder 102 uses the student models 107 to generate reconstructed versions of input images that do not depict sensitive attributes (e.g., gender, skin tone, hair color, etc.). Doing so allows the reconstructed images to be used in certain image processing applications that do not aim to determine sensitive attributes of the person depicted in the input image. For example, a face recognizer model may be able to similarly identify a face in the reconstructed image 304 and the input image 110-1. However, a gender recognizer model (e.g., the master model 104-1) is unable to determine the gender of the person depicted in reconstructed image 304, while being able to determine the gender of the person depicted in input image 110-1. Advantageously, doing so removes bias from unstructured data like surveillance video recordings in common spaces or in offices. Furthermore, as stated, doing so provides high accuracy inference for face recognition, emotion recognition, etc., which are important for personalizing experiences in indoor spaces, while removing sensitive attributes that can lead to privacy issues.

Figure 4:
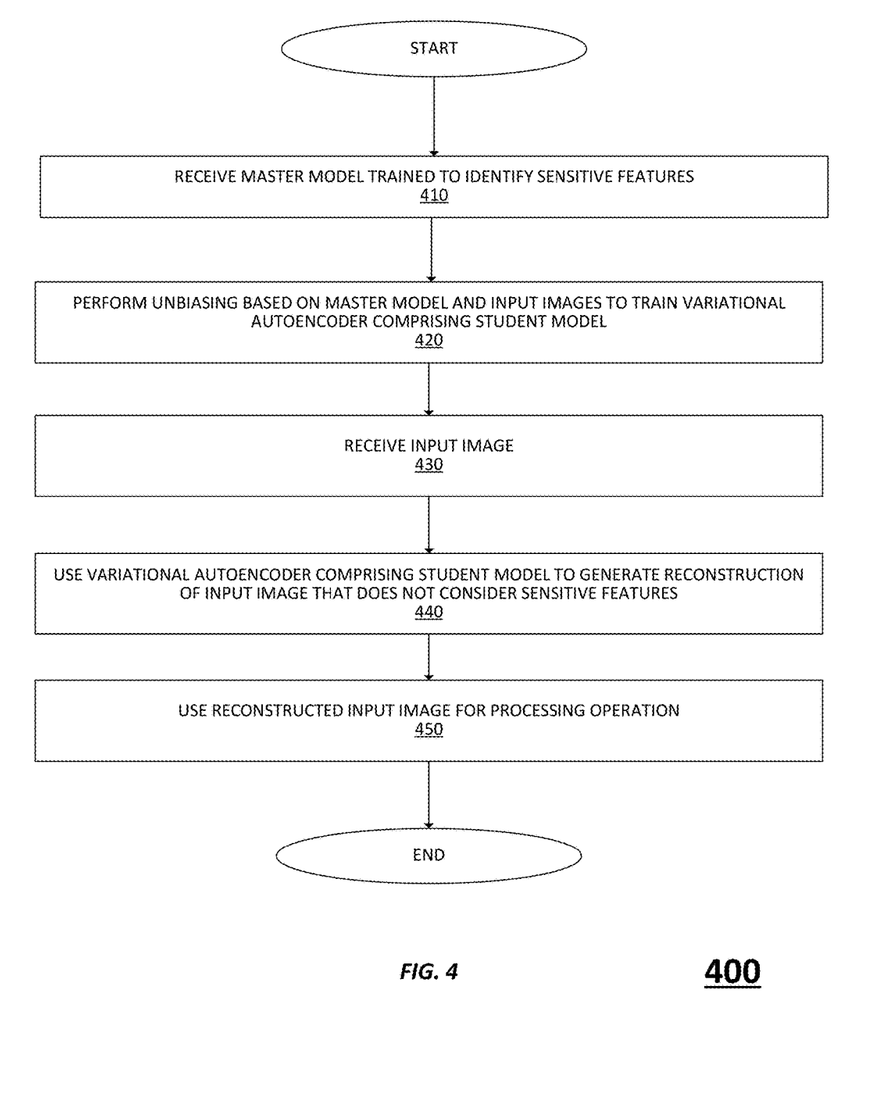
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to train the student models 107 of the variational autoencoder 102. Embodiments are not limited in this context.

As shown, the logic flow 400 begins at block 410, where the variational autoencoder 102 receives a master model 104. The master model 104 may be trained to identify one or more sensitive attributes (e.g., age, race, gender, etc.) of people depicted in digital images. As stated, the master model 104 may be trained based on an ML algorithm 103 and a dataset of training data (e.g., the training data 105). One or more master models 104 may be selected to train the student models 107 based on one or more selected sensitive attributes. At block 420, the variational autoencoder 102 may perform unbiasing based on the master model 104 received at block 410 to train the student models 107 of the variational autoencoder 102. In one embodiment, the student models 107 are neural networks trained based on digital images in the training data 105 (which may be the same and/or different than the training data 105 used to train the master model 104). Doing so trains the student models 107 to generate reconstructed versions of input images that do not consider and/or depict one or more sensitive attributes.

At block 430, the variational autoencoder 102 including the trained student models 107 receives an input image from the input data 110 (and/or from a different source). The input image may be a digital image comprising a matrix of values. The input image may be encoded according to any number and/or types of formats, such as the Joint Photographic Experts Group (JPEG) format, and the Graphic Interchange Format (GIF). At block 440, the variational autoencoder 102 uses the student models 107 to generate a reconstruction 304 of the input image that does not consider and/or depict one or more selected sensitive attributes (and/or any sensitive attributes). At block 450, the reconstructed input image 304 is used for an image processing operation. For example, the image processing operation may include facial recognition to determine whether a face is depicted in the input image 110. As another example, the image processing operation may include emotion detection to determine whether the face is expressing one or more emotions. Advantageously, however, the image processing operation does not include determining one or more selected sensitive attributes of the person, such as gender detection, age detection, race detection, etc., as the reconstructed image 304 does not include sufficient data to facilitate such determinations.

Figure 5:
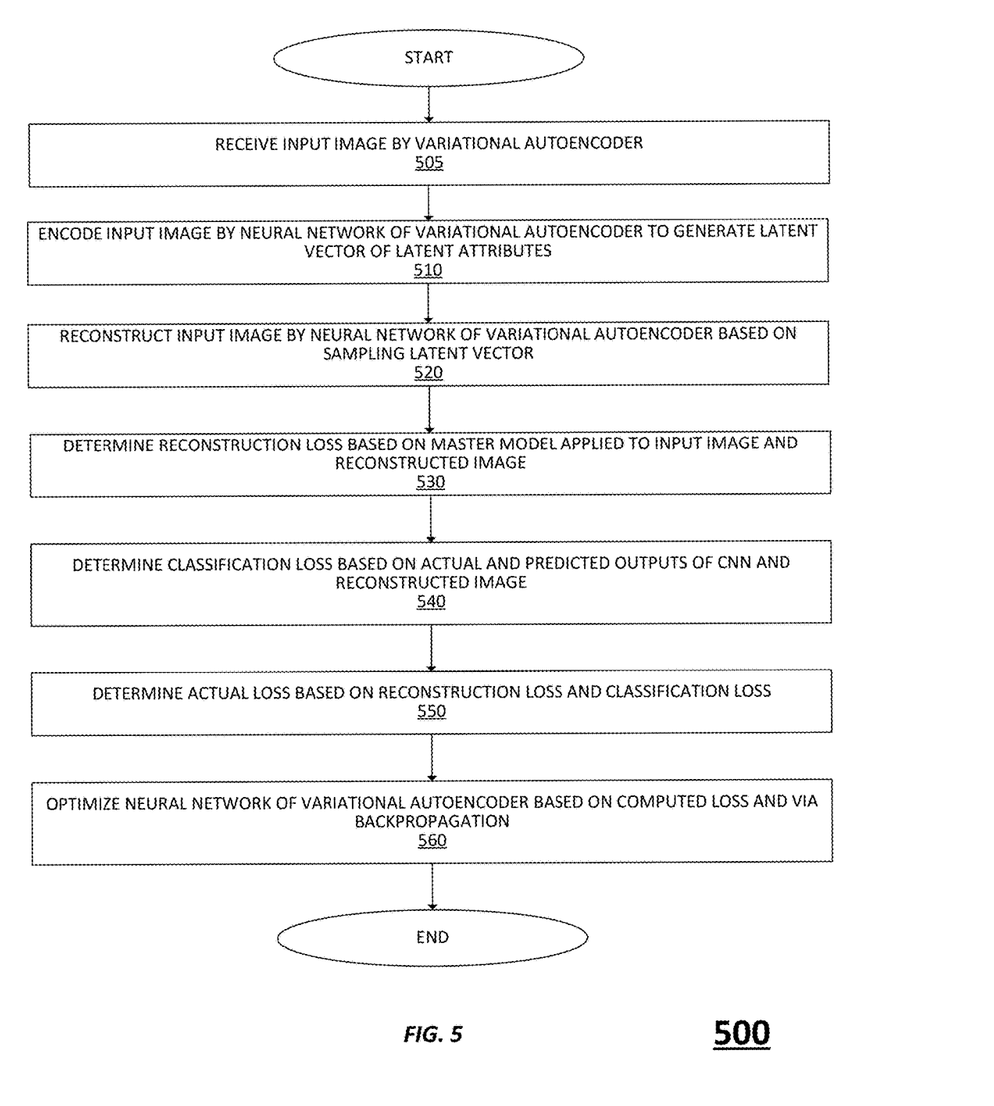
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations performed to train the student models 107 of the variational autoencoder 102. Embodiments are not limited in this context.

As shown, the logic flow 500 begins at block 505, where the variational autoencoder 102 receives an input image. The image may be digital any image, such as an image received from the training data 105, the input data 110, and/or another source. The input image may be a digital image comprising a matrix of values. The input image may be encoded according to any number and/or types of formats, such as the Joint Photographic Experts Group (JPEG) format, and the Graphic Interchange Format (GIF). At block 510, the student models 107 of the variational autoencoder 102 encode the input image received at block 505 to generate a latent vector 302 of latent attributes for the input image. At block 520, the student models 107 of the variational autoencoder 102 reconstruct the input image based on a sampling of the latent vector 302 generated at block 510. Doing so generates a reconstructed image 304 which is a reconstruction of the input image received at block 505.

At block 530, the variational autoencoder 102 determines the reconstruction loss based on the master model 104 applied to the input image received at block 505 and the reconstructed image generated at block 520. As stated, the variational autoencoder 102 may use equation 307 to determine the reconstruction loss, which considers the difference between the input image and the reconstructed image 304. Equation 307 further considers the difference of the output of the master model 104 based on the input image, and the output of the master model 104 based on the reconstructed image 304. At block 540, the variational autoencoder 102 determines the classification loss based on the actual and predicted outputs of the CNN 106, e.g., based on Equation 308. As stated, equation 308 considers a difference between a known vector (e.g., a previously labeled vector reflecting a known output of the CNN 106 based on the input image) and the output of the CNN 106 based on the reconstructed image 304.

At block 550, the variational autoencoder 102 determines the actual loss based on the reconstruction loss determined at block 530 and the classification loss determined at block 540. In one embodiment, the variational autoencoder 102 applies equation 309 to determine the total loss by computing a sum of the reconstruction loss and the classification loss. At block 560, the neural network (e.g., the student model 107) of the variational autoencoder 102 is optimized based on the computed loss values (e.g., the total loss, the reconstruction loss, and/or the classification loss) by back-propagation to refine the weights of the neural network. The steps of logic flow 500 may be repeated any number of times based on any number of input images and/or selected master models 104 corresponding to one or more selected sensitive attributes. Doing so generates the variational autoencoder 102 including one or more trained neural networks (the student models 107) that may be stored for later use. As stated, the variational autoencoder 102 may use the student models 107 to generate reconstructions of input images, which may then be used to perform classification operations that do not pose a risk to the privacy of any persons depicted in the images. Furthermore, the reconstructed images may be outputted for display on a display device.

Figure 6:
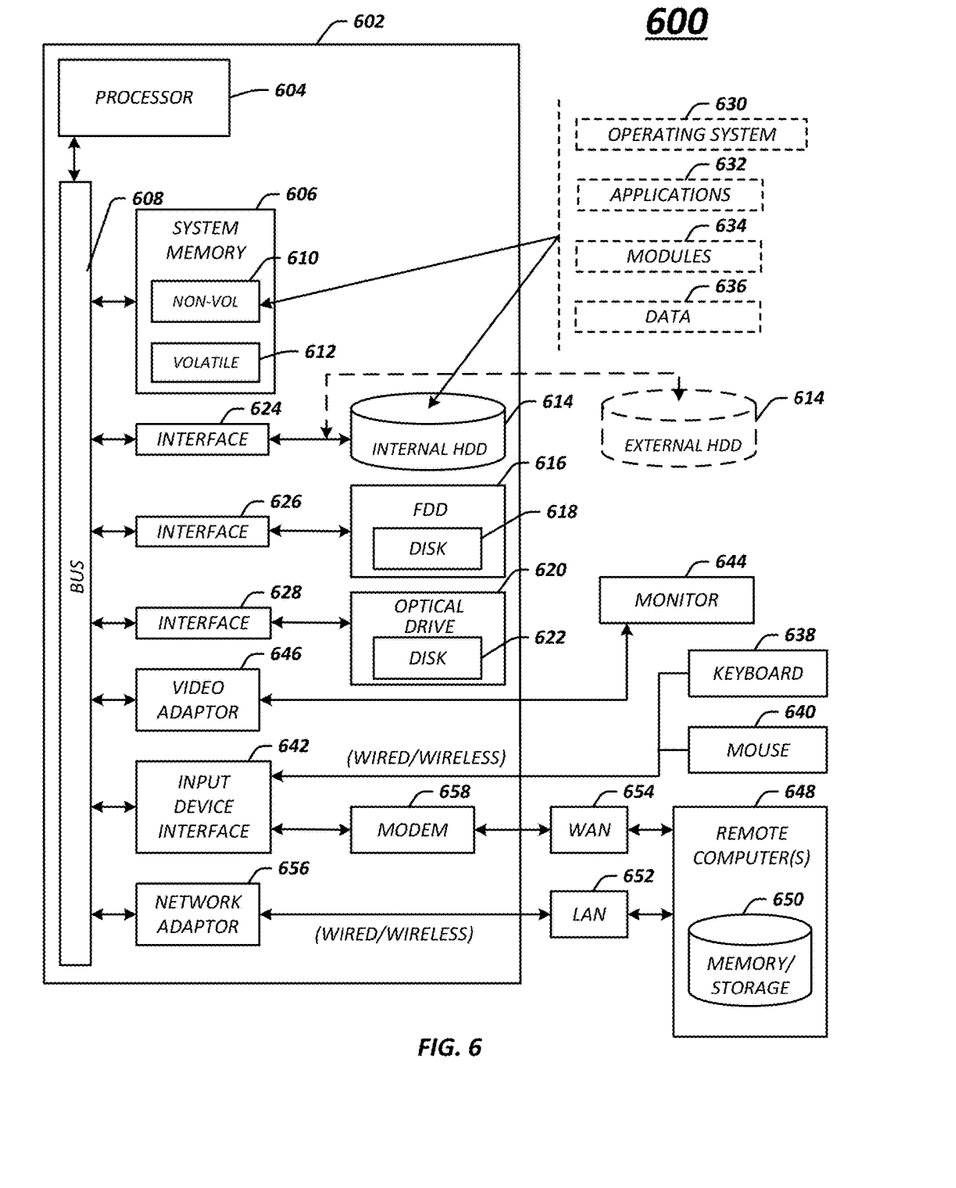
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the computing system 101 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the computing system 101, the processing flows 200, 300, e.g., the variational autoencoder 102, ML algorithm 103, master models 104, training data 105, CNN 106, student models 107, and input data 110.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, processor circuits, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
a processor circuit; and
a memory storing instructions which when executed by the processor circuit cause the processor circuit to:
generate, by a neural network of a variational autoencoder, a latent vector for a first input image;
generate, by the neural network of the variational autoencoder, a first reconstructed image by sampling the latent vector for the first input image;
determine a reconstruction loss incurred in generating the first reconstructed image based at least in part on: (i) a difference of the first input image and the first reconstructed image, and (ii) a master model trained to detect a sensitive attribute in images;
determine a total loss based at least in part on the reconstruction loss and a classification loss; and
optimize a plurality of weights of the neural network of the variational autoencoder based on a backpropagation operation and the determined total loss, the optimization to train the neural network to not consider the sensitive attribute when processing images.

2. The system of claim 1, the memory storing instructions which when executed by the processor circuit cause the processor circuit to:
receive a second input image;
generate, by the neural network of the variational autoencoder, a latent vector for the second input image; and
generate, by the neural network of the variational autoencoder, a second reconstructed image by sampling the latent vector for the second input image, the master model not able to detect the sensitive attribute in the second reconstructed image.

3. The system of claim 2, the memory storing instructions which when executed by the processor circuit cause the processor circuit to:
perform an image processing operation on the second reconstructed image, the image processing operation comprising one or more of: (i) determining whether a face is depicted in the second reconstructed image, and (ii) determining whether the face depicted in the second reconstructed image is expressing one or more emotions.

4. The system of claim 1, the memory storing instructions to determine the classification loss for the first reconstructed image which when executed by the processor circuit cause the processor circuit to:
compute a difference of a predetermined latent vector for the first input image and an output of a convolutional neural network receiving the first reconstructed image as input; and
compute a square of the computed difference.

5. The system of claim 4, the memory storing instructions which when executed by the processor circuit cause the processor circuit to:
determine the total loss for the first reconstructed image based on a sum of the classification loss and the reconstruction loss.

6. The system of claim 5, the memory storing instructions to determine the reconstruction loss which when executed by the processor circuit cause the processor circuit to:
compute a first difference between the first input image and the first reconstructed image;
compute a square of the first difference;
compute a second difference between a first output of the master model and a second output of the master model, the first output based on the first input image, the second output based on the first reconstructed image;
compute a square of the second difference; and
compute a difference of the square of the first difference and the square of the second difference.

7. The system of claim 1, wherein the sensitive attribute comprises one or more of: (i) a gender, (ii) a race, (iii) an age, (iv) a skin tone, and (v) a religion of a person depicted in images, wherein the master model comprises a neural network.

8. A non-transitory computer-readable storage medium storing instructions that when executed by a processor of a computing device, cause the processor to:
generate, by a neural network of a variational autoencoder, a latent vector for a first input image;
generate, by the neural network of the variational autoencoder, a first reconstructed image by sampling the latent vector for the first input image;
determine a reconstruction loss incurred in generating the first reconstructed image based at least in part on: (i) a difference of the first input image and the first reconstructed image, and (ii) a master model trained to detect a sensitive attribute in images;
determine a total loss based at least in part on the reconstruction loss and a classification loss; and
optimize a plurality of weights of the neural network of the variational autoencoder based on a backpropagation operation and the determined total loss, the optimization to train the neural network to not consider the sensitive attribute when processing images.

9. The non-transitory computer-readable storage medium of claim 8, further storing instructions that when executed by the processor cause the processor to:
receive a second input image;
generate, by the neural network of the variational autoencoder, a latent vector for the second input image; and
generate, by the neural network of the variational autoencoder, a second reconstructed image by sampling the latent vector for the second input image, the master model not able to detect the sensitive attribute in the second reconstructed image.

10. The non-transitory computer-readable storage medium of claim 9, further storing instructions that when executed by the processor cause the processor to:
perform an image processing operation on the second reconstructed image, the image processing operation comprising one or more of: (i) determining whether a face is depicted in the second reconstructed image, and (ii) determining whether the face depicted in the second reconstructed image is expressing one or more emotions.

11. The non-transitory computer-readable storage medium of claim 8, further storing instructions that when executed by the processor cause the processor to:
compute a difference of a predetermined latent vector for the first input image and an output of a convolutional neural network receiving the first reconstructed image as input; and
compute a square of the computed difference to determine the classification loss for the first reconstructed image.

12. The non-transitory computer-readable storage medium of claim 11, further storing instructions that when executed by the processor cause the processor to:

determine the total loss for the first reconstructed image based on a sum of the classification loss and the reconstruction loss.

13. The non-transitory computer-readable storage medium of claim 12, further storing instructions that when executed by the processor cause the processor to:
compute a first difference between the first input image and the first reconstructed image;
compute a square of the first difference;
compute a second difference between a first output of the master model and a second output of the master model, the first output based on the first input image, the second output based on the first reconstructed image;
compute a square of the second difference; and
compute, as the reconstruction loss, a difference of the square of the first difference and the square of the second difference.

14. The non-transitory computer-readable storage medium of claim 8, wherein the sensitive attribute comprises one or more of: (i) a gender, (ii) a race, (iii) an age, (iv) a skin tone, and (v) a religion of a person depicted in images, wherein the master model comprises a neural network.

15. A method, comprising:
generating, by a neural network of a variational autoencoder, a latent vector for a first input image;
generating, by the neural network of the variational autoencoder, a first reconstructed image by sampling the latent vector for the first input image;
determining a reconstruction loss incurred in generating the first reconstructed image based at least in part on: (i) a difference of the first input image and the first reconstructed image, and (ii) a master model trained to detect a sensitive attribute in images;
determining a total loss based at least in part on the reconstruction loss and a classification loss; and
optimizing a plurality of weights of the neural network of the variational autoencoder based on a backpropagation operation and the determined total loss, the optimization to train the neural network to not consider the sensitive attribute when processing images.

16. The method of claim 15, further comprising:
receiving a second input image;
generating, by the neural network of the variational autoencoder, a latent vector for the second input image; and
generating, by the neural network of the variational autoencoder, a second reconstructed image by sampling the latent vector for the second input image, the master model not able to detect the sensitive attribute in the second reconstructed image.

17. The method of claim 16, further comprising:
performing an image processing operation on the second reconstructed image, the image processing operation comprising one or more of: (i) determining whether a face is depicted in the second reconstructed image, and (ii) determining whether the face depicted in the second reconstructed image is expressing one or more emotions.

18. The method of claim 15, the method further comprising:
computing a difference of a predetermined latent vector for the first input image and an output of a convolutional neural network receiving the first reconstructed image as input; and
computing a square of the computed difference to determine the classification loss for the first reconstructed image.

19. The method of claim 18, further comprising:
determining the total loss for the first reconstructed image based on a sum of the classification loss and the reconstruction loss.

20. The method of claim 15, wherein the sensitive attribute comprises one or more of: (i) a gender, (ii) a race, (iii) an age, (iv) a skin tone, and (v) a religion of a person depicted in images, wherein the master model comprises a neural network, the method further comprising:
computing a first difference between the first input image and the first reconstructed image;
computing a square of the first difference;
computing a second difference between a first output of the master model and a second output of the master model, the first output based on the first input image, the second output based on the first reconstructed image;
computing a square of the second difference; and
computing, as the reconstruction loss, a difference of the square of the first difference and the square of the second difference.

* * * * *